(12) United States Patent
Kjellnes et al.

(10) Patent No.: US 12,345,135 B2
(45) Date of Patent: Jul. 1, 2025

(54) POWER CONTROL SYSTEM FOR SUBSEA EQUIPMENT

(71) Applicant: OneSubsea IP UK Limited, London (GB)

(72) Inventors: Hans Fredrik Kjellnes, Nesttun (NO); Bernt Helge Torkildsen, Sandsli (NO); Audun Magne Askeland, Sandsli (NO)

(73) Assignee: OneSubsea IP UK Limited, London (GB)

(*) Notice: Subject to any disclaimer, the term of this patent is extended or adjusted under 35 U.S.C. 154(b) by 0 days.

(21) Appl. No.: 18/570,088

(22) PCT Filed: Jun. 16, 2022

(86) PCT No.: PCT/US2022/033843
§ 371 (c)(1),
(2) Date: Dec. 14, 2023

(87) PCT Pub. No.: WO2022/266355
PCT Pub. Date: Dec. 22, 2022

(65) Prior Publication Data
US 2024/0280003 A1     Aug. 22, 2024

Related U.S. Application Data (60) Provisional application No. 63/211,287, filed on Jun. 16, 2021.

(51) Int. Cl.
*E21B 41/00*     (2006.01)
*H02J 3/38*     (2006.01)

(52) U.S. Cl.
CPC ...... *E21B 41/0085* (2013.01); *E21B 41/0007* (2013.01); *H02J 3/381* (2013.01); *H02J 2300/24* (2020.01); *H02J 2300/28* (2020.01)

(58) Field of Classification Search
CPC .. E21B 41/0085; E21B 41/0007; E21B 41/00; H02J 3/38; H02J 3/381; H02J 2300/28; H02J 2300/24
See application file for complete search history.

(56) References Cited

U.S. PATENT DOCUMENTS

2007/0193744 A1    8/2007   Bridges
2010/0000733 A1    1/2010   Chiesa
(Continued)

FOREIGN PATENT DOCUMENTS

WO     2011028895 A2     3/2011

OTHER PUBLICATIONS

Search Report and Written Opinion of International Patent Application No. PCT/US2022/033843 dated on Oct. 13, 2022, 11 Pages.
(Continued)

*Primary Examiner* — Robert L Deberadinis
(74) *Attorney, Agent, or Firm* — Jeffrey D. Frantz (57) ABSTRACT

A non-transitory, computer-readable medium includes instructions that, when executed by processing circuitry, are configured to cause the processing circuitry to receive input data, determine available power from an intermittent power source based on the input data, determine power demand of subsea equipment based on the input data, operate a switch to enable power flow from the intermittent power source to the subsea equipment as a primary source of power for the subsea equipment, and operate the switch to enable additional power flow from a steady power source to the subsea equipment in response to determining that the available power is less than the power demand. The intermittent power source comprises a wind turbine, a solar cell, a marine power system, or any combination thereof, and the steady power source comprises a generator, a power storage, grid power, or any combination thereof.

20 Claims, 5 Drawing Sheets

(56) References Cited

U.S. PATENT DOCUMENTS

| | | | |
|---|---|---|---|
| 2010/0282460 A1* | 11/2010 | Stone | E21B 43/2401 700/29 |
| 2012/0138293 A1 | 6/2012 | Kaminsky | |
| 2014/0345599 A1 | 11/2014 | O'Donnell | |
| 2016/0070249 A1* | 3/2016 | Debone | G05B 19/042 700/296 |

OTHER PUBLICATIONS

International Preliminary Report on Patentability of International Patent Application No. PCT/US2022/033843 dated on Dec. 28, 2023, 8 Pages.

Win Win Joint Industry Project: Wind—Powered Water Injection, DNV.GL, May 2019, 9 pages.

* cited by examiner

POWER CONTROL SYSTEM FOR SUBSEA EQUIPMENT

CROSS-REFERENCE TO RELATED APPLICATION

This application is a National Stage Entry of International Application No. PCT/US2022/033843, filed Jun. 16, 2022, which claims priority to and the benefit of U.S. Provisional Application No. 63/211,287, entitled "SUBSEA HYBRID WINDPOWER SYSTEM AND METHOD," filed Jun. 16, 2021, which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Subsea systems may be used to perform various operations with respect to subterranean geologic formation, referred to as a reservoir. For example, subsea equipment of the subsea systems may drill a well that penetrates the subterranean geologic formation, extract hydrocarbon fluids (e.g., oil and natural gas) from the well, inject material into the subterranean geologic formation, and so forth. Operation of a subsea system may consume power, such as electric power, to operate various equipment. Unfortunately, the power consumption by the equipment adds costs to the extraction of hydrocarbon fluids by the subsea system. Additionally, the power provided by a certain power source may not be sufficient to enable operation of the subsea equipment in some circumstances.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory, computer-readable medium includes instructions that, when executed by processing circuitry, are configured to cause the processing circuitry to receive input data, determine available power from an intermittent power source based on the input data, determine power demand of subsea equipment based on the input data, operate a switch to enable power flow from the intermittent power source to the subsea equipment as a primary source of power for the subsea equipment, and operate the switch to enable additional power flow from a steady power source to the subsea equipment in response to determining that the available power is less than the power demand. The intermittent power source includes a wind turbine, a solar cell, a marine power system, or any combination thereof, and the steady power source includes a generator, a power storage, grid power, or any combination thereof.

In an embodiment, a method includes operating a switch to enable power flow from an intermittent power source to subsea equipment as a primary source of power, operating the switch to enable additional power flow from a steady power source to the subsea equipment in response to determining that available power from the intermittent power source is less than power demand of the subsea equipment, and operating the switch to block the additional power flow from the steady power source to the subsea equipment in response to determining that the available power from the intermittent power source is greater than or equal to the power demand of the subsea equipment. The intermittent power source includes a wind turbine, a solar cell, a marine power system, or any combination thereof, and the steady power source includes a generator, a power storage, grid power, or any combination thereof.

In an embodiment, a system includes a switchgear configured to enable first power flow between an intermittent power source and the switchgear and to enable second power flow between a steady power source and the switchgear, subsea equipment configured to receive the first power flow, the second power flow, or both via the switchgear, and a controller communicatively coupled to the switchgear and configured to operate the switchgear to enable the first power flow to the subsea equipment as a primary source of power and enable the second power flow to the subsea equipment in response to determining that the first power flow is less than power demand of the subsea equipment. The intermittent power source includes a wind turbine, a solar cell, a marine power system, or any combination thereof, the steady power source includes a generator, a power storage, grid power, or any combination thereof, and the steady power source is configured to provide power to a topside system.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience but does not require any particular orientation of the components relative to some fixed reference, such as the direction of gravity. The term "fluid" encompasses liquids, gases, vapors, and combinations thereof. Numerical terms, such as "first," "second," and "third" are used to distinguish components to facilitate discussion, and it should be noted that the numerical terms may be used differently or assigned to different elements in the claims.

Certain terms are used throughout the description and claims to refer to particular features or components. As one skilled in the art will appreciate, different persons may refer to the same feature or component by different names. This document does not intend to distinguish between components or features that differ in name, but not function.

This disclosure herein generally involves a subsea system. The subsea system may operate to form a wellbore through a surface (e.g., an onshore surface, an offshore surface) and into a reservoir, extract resources, such as a hydrocarbon fluid (e.g., oil and natural gas), from the reservoir, input material, such as water and/or carbon dioxide, into the reservoir, among other operations. The subsea system may include various subsea equipment, such as turbomachinery (e.g., a pump, a compressor, a turbine), a pipeline, a sensor, and so forth. In some embodiments, the subsea system may be connected to a topside system. For example, the topside system may process the resources extracted from the reservoir.

The subsea equipment may consume power to operate. In certain embodiments, the power may be provided by an intermittent power source, such as a renewable power generator (e.g., a wind turbine, a solar panel, a wave energy converter (WEC), etc.). For example, the wind turbine harvests energy from wind by driving a plurality of wind turbine blades to rotate an electrical generator. The solar panel uses sunlight as a source of energy to generate direct current electricity via photo-voltaic cells. The wave energy converter harvests energy from waves in a body of water by using the force of the waves to drive an electrical generator. Each of the foregoing intermittent power sources generally provides a variable amount of power due to variations in the source of renewable energy, e.g., wind, sunlight, and waves. As a result, in some circumstances, the amount of power available from the intermittent power source may not be sufficient to operate the subsea equipment. For instance, the intermittent power source may be configured to generate power by harvesting power from an ambient environment, but environmental conditions may not enable the intermittent power source to provide a sufficient amount of power. During such circumstances in which the amount of power available from the intermittent power source is deficient or insufficient, the subsea system may not operate desirably.

Accordingly, it is recognized that providing power from an additional power source to the subsea system while the available power from the intermittent power source is deficient may improve desirable operation of the subsea system. Thus, embodiments of the present disclosure are directed to systems and methods for operating a steady power source to provide power to the subsea system while the available power from the intermittent power source is deficient. The steady power source may more reliably provide power as compared to the intermittent power source. As an example, the steady power source may include a generator, stored power, and/or grid power that are used to power various equipment of the topside system (e.g., equipment on a platform disposed at or above a surface of a body of water). A control system may determine that the available power from the intermittent power source is less than a power demand of the subsea system and, in response, enable power supply from the steady power source to the subsea system. In this manner, while there is an insufficient amount of power available from the intermittent power source, the subsea system may continue to operate desirably by utilizing the power from the steady power source.

Although the present disclosure primarily describes operations with respect to subsea equipment, it should be noted that the techniques described herein may be applied to any other suitable equipment. For example, equipment at the topside system or any other suitable equipment that consumes power from an intermittent power source may utilize power from the steady power source while the power from the intermittent power source is deficient.

Figure 1:
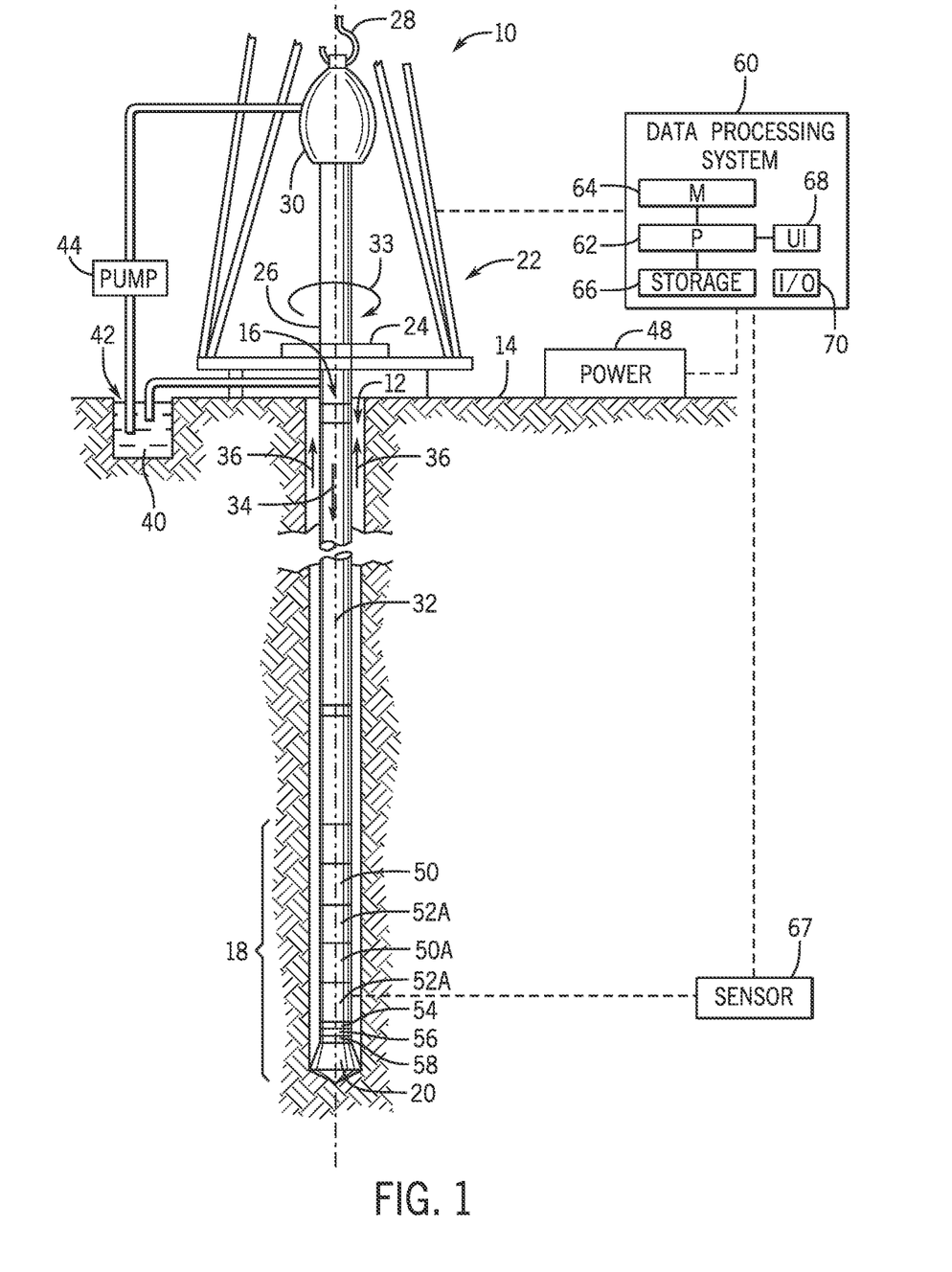
FIG. 1 is a schematic illustration of a system that may be used to form a wellbore for extracting resources, such as hydrocarbon fluids, according to an embodiment of the present disclosure.

To help illustrate the techniques described herein, FIG. 1 shows one embodiment of a system 10 at a well site, in which the system 10 may be used to form a borehole 12 (e.g., wellbore) through geological formations 14 that may be onshore or offshore. The system 10 of FIG. 1 is designed to receive power from one or more intermittent power sources (e.g., a wind turbine, a solar panel, a wave energy converter (WEC), etc.), while also compensating for any deficiencies (e.g., insufficient power) from the intermittent power sources by using one or more additional power sources (e.g., combustion engine driven generators at a topside system). Accordingly, various components of the system 10 will be discussed with reference to FIG. 1, followed by a discussion of the power supply to the system 10 with reference to FIGS. 2-5. In some embodiments, the system 10 may also facilitate milling operations to cut metal objects to be removed from the borehole 12 and/or plugging and abandonment operations to close the borehole 12. The system 10 may include a drill string 16 suspended within the borehole 12, and the system 10 may have a bottom hole assembly (BHA) 18 that includes a drill bit 20 at its lower end, in which the drill bit 20 engages the geological formations 14. The drill bit 20 includes any cutting structure (e.g., a reamer) that may be used to engage and cut the geological formations 14.

The system 10 also includes a surface system 22 that rotates and drives the drill string 16. In some embodiments, the system 10 may include a kelly system having a rotary table 24, a kelly 26, a hook 28, and a rotary swivel 30. The drill string 16 may be coupled to the hook 28 through the kelly 26 and the rotary swivel 30. The rotary swivel 30 may be suspended from the hook 28 that is attached to a traveling block (not shown) that drives the drill string 16 relative to the surface system 22 along an axis 32 that extends through a center of the borehole 12. Furthermore, the rotary swivel 30 may permit rotation of the drill string 16 relative to the hook 28, and the rotary table 24 may rotate in a rotational direction 33 to drive the drill string 16 to rotate concentrically about the axis 32. Alternatively, the system 10 may be a top drive system that rotates the drill string 16 via an internal drive (e.g., an internal motor) of the rotary swivel 30. That is, the system 10 may not use the rotary table 24 and the kelly 26 to rotate the drill string 16. Rather, the internal drive of the rotary swivel 30 may drive the drill string 16 to rotate in the rotational direction 33 relative to the hook 28 concentrically about the axis 32.

As the surface system 22 rotates the drill string 16, the surface system 22 may further drive the drill string 16 in axial directions to engage the drill string 16 with the geological formations 14. For example, the drill string 16 may be driven into the geological formation 14 through the borehole 12 in a first axial direction 34, which may be a generally downward vertical direction. Additionally, the drill string 16 may be removed from the borehole 12 in a second axial direction 36 opposite the first axial direction 34. That is, the second axial direction 36 may be a generally upward vertical direction. The combined axial and rotational movement of the drill string 16 may facilitate engagement of the drill string 16 with the geological formations 14. Although FIG. 1 illustrates that the drill string 16 is driven in generally vertical directions, the drill string 16 may navigate through the borehole 12 in directions crosswise to the first and second axial directions 34, 36, such as transitioning to a generally horizontal direction.

The surface system 22 may also include mud or drilling fluid 40 that may be directed into the drill string 16 to cool and/or lubricate the drill bit 20. Additionally, the drilling fluid 40 may exert a mud pressure on the geological formations 14 to reduce likelihood of fluid from the geological formations 14 flowing into and/or out of the borehole 12. In some embodiments, the drilling fluid 40 may be stored in a pit 42 formed at the well site. A pump 44 may fluidly couple the pit 42 and the swivel 30 to one another, in which the pump 44 may deliver the drilling fluid 40 to the interior of the drill string 16 via a port in the swivel 30, causing the drilling fluid 40 to flow downwardly through the drill string 16 in the first axial direction 34. The drilling fluid 40 may also exit the drill string 16 via ports in the drill bit 20 and flow into the borehole 12 toward the surface (e.g., toward the surface system 22). While drilling, the drilling fluid 40 may circulate upwardly in the second axial direction 36 through an annulus region between the outside of the drill string 16 and a wall of the borehole 12, thereby carrying drill cuttings away from the bottom of the borehole 12. Once at the surface, the returned drilling fluid 40 may be filtered and conveyed back to the pit 42 for recirculation and reuse.

The BHA 18 of the system 10 of FIG. 1 may include various downhole tools, such as a logging-while-drilling (LWD) module 50 and/or a measuring-while-drilling (MWD) module 52. Generally, the downhole tools may facilitate determining a performance of the drill string 16, such as by determining a parameter of the drill string 16, of the surrounding geological formation 14, and the like. It should also be noted that more than one LWD module 50 and/or MWD module 52 may be employed. For example, the BHA 18 may include an additional LWD module 50A and/or an additional MWD module 52A positioned adjacent to the drill bit 20. As such, references made to the LWD module 50 may also refer to the LWD module 50A and references made to the MWD module 52 may also refer to the MWD module 52A.

The LWD module 50 and/or the MWD module 52 may each be housed in a special type of drill collar and may contain one or more types of logging tools. In general, the LWD module 50 may include capabilities for measuring, processing, and storing information, and the MWD module 52 may contain one or more devices for measuring characteristics of the drill string 16 and/or the drill bit 20, as well as for communicating with surface equipment. In the system 10 of FIG. 1, the LWD module 50 and/or the MWD module 52 may include one or more of the following types of measuring devices: a weight-on-bit measuring device, a torque measuring device, a bend measuring device, a vibration measuring device, a shock measuring device, a stick slip measuring device, a direction measuring device, and/or an inclination measuring device.

The BHA 18 may further include a motor 54 and/or a rotary-steerable system (RSS) 56 coupled to the drill bit 20 via additional tubulars 58. The motor 54 and/or the RSS 56 are used to regulate operation of the drill bit 20 to engage with the geological formations 14. For example, the RSS 56 may orient the drill bit 20 in a desirable direction while the motor causes the drill bit 20 to rotate continuously to drill the borehole 12. Generating continuous rotation may enable improved transportation of drilled cuttings to the surface, better cutting of the borehole 12, limited stress imparted upon the drill bit 20 by the geological formations 14, and so forth. Furthermore, the RSS 56 may enable control of the engagement of the drill string 16 with the geological formations 14. By way of example, the RSS 56 may place the drill string 16 in communication with the surface system 22. As such, the surface system 22 may control a direction or path for the drill string 16 to form the borehole 12 and/or a manner in which the drill string 16 engages with the geological formations 14 (e.g., a rotation of the drill string 16).

In certain embodiments, the drill string 16 may include or be communicatively coupled with a data processing system 60 that may adjust the operation of the system 10, such as to direct the drill string 16 through the borehole 12. The data processing system 60 may include one or more processors 62, such as a general purpose microprocessor, an application specific processor (ASIC), and/or a field programmable gate array (FPGA) or other programmable logic device. The one or more processors 62 may execute instructions stored in a memory 64 and/or a storage 66, which may be read-only memory (ROM), random-access memory (RAM), flash memory, an optical storage medium, a hard disk drive, and the like. The data processing system 60 may further be communicatively coupled with a sensor 67 that may determine an operating parameter of the drill string 16. As an example, the sensor 67 may be a position sensor, and the operating parameter may indicate an orientation of the drill string 16. The sensor 67 may transmit signals or data to the data processing system 60 indicative of the operating parameter. The data processing system 60 may operate the system 10, such as to adjust the direction through which the drill string 16 forms the borehole 12, based on the signals received from the sensor 67.

Although the illustrated embodiment of the data processing system 60 is located external to the drill string 16, the data processing system 60 may alternatively be a part of the drill string 16, such as disposed within the BHA 18. The data processing system 60 may alternatively be a device located proximate to the drilling operation (e.g., at the surface system 22) and/or a remote data processing device located away from the system 10, such as a mobile computing device (e.g., tablet, smart phone, laptop) or a server remote from the system 10. The data processing system 60 may process downhole measurements in real time or sometime after the data has been collected. In general, the data processing system 60 may store and process collected data, such as data collected in the BHA 18 via the LWD module 50, the MWD module 52, and/or any suitable telemetry (e.g., electrical signals pulsed through the geological formations 14 or mud pulse telemetry using the drilling fluid 40). In further embodiments, separate data processing systems 60 may be used to direct the drill string 16, to rotate the drill string 16, and/or to raise or lower the drill string 16.

In some embodiments, the data processing system 60 may also include a user interface 68 that may enable a user to interact with the data processing system 60. For example, the user may input properties and/or instructions (e.g., control commands) to the data processing system 60 via the user interface 68. To this end, the user interface 68 may include a button, a keyboard, a microphone, a mousing device, a trackpad, and the like. The user interface 68 may also include a display, which may be any suitable electronic display that displays visual representations of information, such as graphical representations of collected data.

Further still, the data processing system 60 may include input/output (I/O) ports 70 that enable the data processing system 60 to communicate with various electronic devices. For example, the I/O ports 70 may enable the data processing system 60 to directly couple to another electronic device (e.g., a mobile device) to enable data to transfer between the data processing system 60 and the electronic device. The I/O ports 70 may additionally or alternatively enable the data processing system 60 to indirectly couple to other electronic devices. In another example, the I/O ports 70 may enable the data processing system 60 to couple to a network, such as a personal area network (PAN), a local area network (LAN), and/or a wide area network (WAN). Accordingly, in some embodiments, the data processing system 60 may receive data (e.g., as signals) from another electronic device (e.g., a base-station control system) and/or communicate data to another electronic device via the I/O ports 70.

The system 10 may include a power source 48 used to supply power to operate various components of the system 10, such as the BHA 18 (e.g., the LWD module 50, the MWD module 52), the surface system 22 (e.g., the pump), the sensor 67, and so forth. As described herein, the power source 48 may include multiple types of power sources, such as an intermittent power source and/or a steady power source. Power supply from the different power sources may be controlled (e.g., via the data processing system 60) based on an amount of power available. For instance, power supply from an intermittent power source may be primarily used to operate the system 10. In other words, the power source 48 may be configured to use the power from the intermittent power source (e.g., one or more wind turbines, solar panels, and/or wave energy converters) prior to using any power from a steady state power source, such that the system 10 is operated with renewable energy as a first or primary source of power. However, in response to determining that the available power from the intermittent power source is deficient, power from a steady power source may be supplied. The steady state power source may include combustion engine driven generators, batteries that store excess energy, grid power (e.g., direct connection with a power grid), or any combination thereof. The combustion engine driven generators may include gas turbine driven generators, reciprocating engine driven generators, or a combination thereof.

The power source 48 may also be used to enable operations of other systems. For instance, after the borehole 12 has been formed via the system 10, a resource flow may be directed through the borehole 12, such as in the second axial direction 36, for extraction. As an example, the borehole 12 may extend to a reservoir containing the resource flow, and the reservoir may be sufficiently pressurized to drive the resource flow through the borehole 12. Power from the power source 48 (e.g., a combination of the intermittent power source and the steady power source) may be used to enable extraction of the resource flow. Additionally, after an amount of resources have been extracted from the reservoir, such as to cause the pressure of the reservoir to fall below a threshold pressure, power from the power source 48 may be used to direct material into the reservoir to fill the reservoir and prepare the reservoir for abandonment. During any of these operations, power may be distributed from different power sources based on respective, available amounts of the power.

Figure 2:
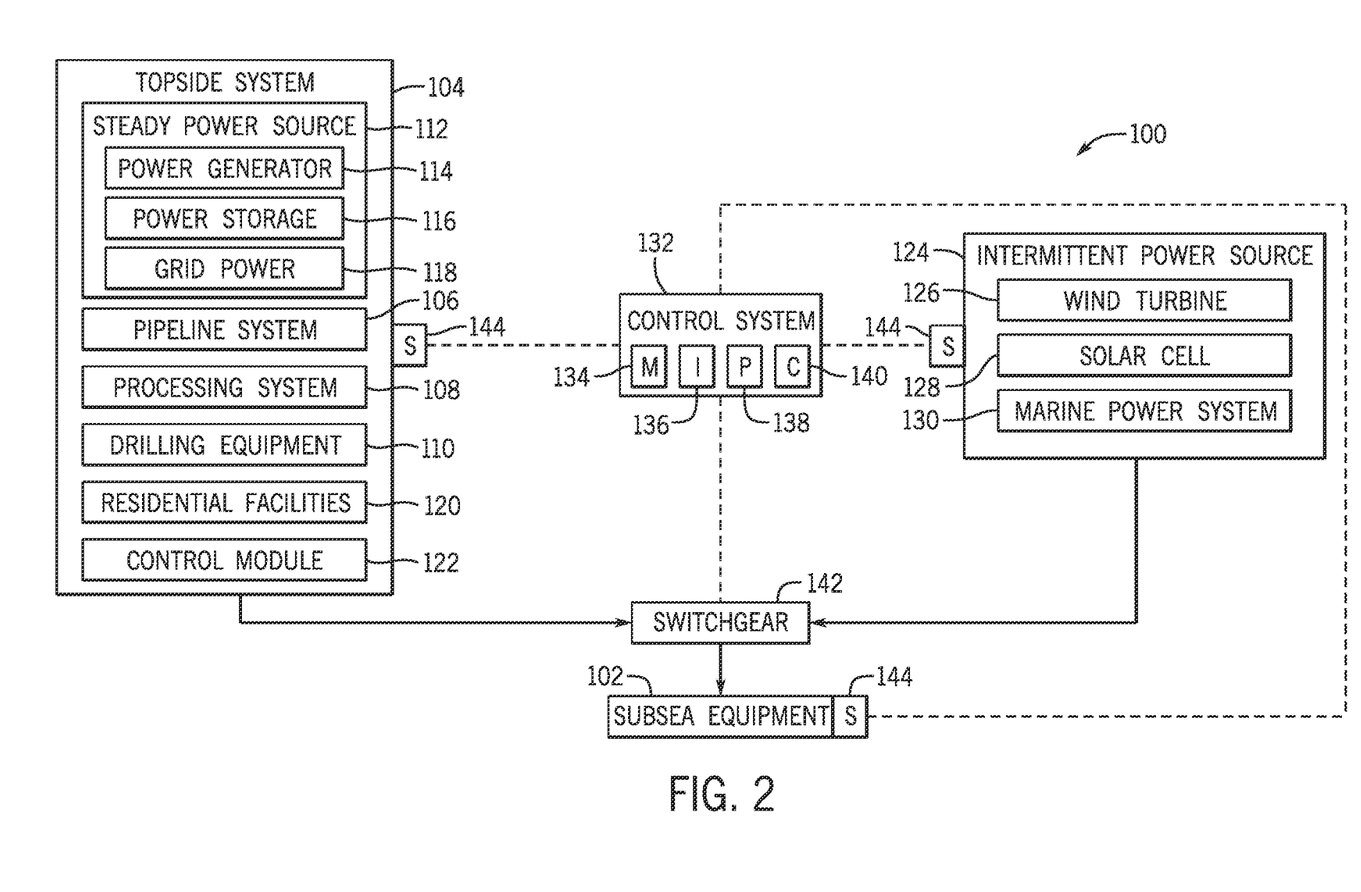
FIG. 2 is a schematic illustration of a system configured to control power supply to subsea equipment, according to an embodiment of the present disclosure.

FIG. 2 is a schematic illustration of an embodiment of a system 100 having power control for subsea equipment 102. For example, the subsea equipment 102 may include any of the components (e.g., the BHA 18) described above, turbomachinery (e.g., a compressor, a turbine, a pump), pipeline equipment (e.g., for pipeline heating), or any other suitable component configured to perform a subsea operation. The system 100 may also include a topside system 104, such as an offshore platform, a processing facility, an onshore facility, and so forth. In some embodiments, the subsea equipment 102 may operate to extract resources, such as from a reservoir located below a body of water. The topside system 104 may receive the resources. For instance, a pipeline system 106 of the topside system 104 may transport the resources to the topside system 104. The pipeline system 106 may include any combination of a conduit through which the resources may flow, a regulator configured to maintain a flow rate of the resources, a pump configured to drive flow of the resources, and/or a valve configured to enable or block flow of the resources. The topside system 104 may include a processing system 108 that may process the resources. As an example, the processing system 108 may perform refinement, product development, and/or transportation operations with respect to extracted resources. The topside system 104 may additionally or alternatively include drilling equipment 110, such as any component of the system 100, configured to form a wellbore. Indeed, the topside system 104 may include any suitable components to perform various operations in conjunction with or in parallel with operation of the subsea equipment 102.

The topside system 104 may include or be electrically coupled to a steady power source 112 configured to provide power (e.g., electric power) to enable operation of the pipeline system 106, the processing system 108, and/or the drilling equipment 110. The steady power source 112 may include any suitable component configured to operate as a reliable source of power, such as to readily provide power on demand. As an example, the steady power source 112 may include a power generator 114 (e.g., a combustion engine driven generator such as a gas turbine driven generator and/or a reciprocating engine driven generator), a power storage 116 (e.g., a battery and/or hydrogen energy storage), and/or grid power 118 (e.g., electrical power grid). In certain embodiments, the power generator 114 may include a plurality of power generators, such as 2, 3, 4, 5, or more power generators of the same or different types and power generation capacities. The power generator 114 can be controlled to provide a desired power output up to the power generation capacity by controlling various operational parameters, including a supply of an energy source (e.g., liquid and/or gas fuel) into a combustion system of the combustion engine driven generator.

In some embodiments, the topside system 104 may include other components configured to operate by utilizing power provided by the steady power source 112. As an example, the topside system 104 may include residential facilities 120, such as a heating, ventilation, and/or air conditioning system, lighting, appliances, or other components that may facilitate accommodation of personnel at the topside system 104. As another example, the topside system 104 may include a control module 122, such as a pump control module, a power control module, or any other control module that may control operation of any of the components described above. The steady power source 112 may be configured to provide sufficient power to operate any of the aforementioned components of the topside system 104.

In certain embodiments, operation of the steady power source 112 to provide power may change over time. For example, during a first period of time, the power generator 114 may operate to provide power. During a second period of time, the power storage 116 may provide power, and operation of the power generator 114 may be reduced or suspended. During a third period of time, the grid power 118 (e.g., instead of the power generator 114 and the power storage 116) may provide power. Indeed, any combination of the power generator 114, the power storage 116, and the grid power 118 may provide power at different periods of time. Adjusting the manner in which the steady power source 112 provides power may reduce usage and/or wear of different aspects of the steady power source 112, thereby improving a longevity, a structural integrity, a useful lifespan, and/or an efficient operation of the steady power source 112.

The subsea equipment 102 may also utilize power during operation. For instance, the subsea equipment 102 may primarily receive power from an intermittent power source 124 of the system 100. The intermittent power source 124 may include any suitable power source configured to provide power, but the amount of power from the intermittent power source 124 may be less reliably, continuously, or predictably available with respect to that of the steady power source 112. For example, the intermittent power sources may rely on naturally occurring energy sources (or renewable energy), such as wind, sunlight, and waves, which are not controllable to produce the desired power output. That is, the intermittent power source 124 may generate power by harvesting energy from environmental surroundings, but the amount of power generated may be based on environment conditions, which can change at different time intervals. In certain embodiments, the intermittent power source 124 may include any suitable number of wind turbines 126 configured to generate power by harnessing kinetic energy from wind, solar cells 128 configured to generate power from solar energy, marine power systems 130 configured to generate power from energy (e.g., kinetic energy, tidal energy, wave energy, salinity gradient energy, thermal gradient energy) associated with water flow, or any other suitable component. The intermittent power source 124 may be positioned offshore (e.g., at least partially submerged within a body of water) in some embodiments. Additionally or alternatively, the intermittent power source 124 may be positioned onshore. In further embodiments, the intermittent power source 124 may be subsea.

The power generated by the intermittent power source 124 while in operation (e.g., full operation) may sufficiently operate the subsea equipment 102. However, in some circumstances, the intermittent power source 124 may not provide sufficient power to operate the subsea equipment 102. For example, the wind speed may be below a threshold speed, the solar cell 128 may not be sufficiently exposed to the sun (e.g., because of clouds, because of nighttime), and/or water may not flow at a sufficient speed. As a result, the power from the intermittent power source 124 may not enable desirable operation of the subsea equipment 102. For this reason, the subsea equipment 102 may additionally or alternatively utilize power (e.g., secondary power, auxiliary power) from the steady power source 112 while the amount of power from the intermittent power source 124 is deficient.

To this end, the system 100 may include a control system 132 (e.g., the data processing system 60, control circuitry, an automation controller, a programmable controller, an electronic controller) configured to control power supply from the intermittent power source 124 and/or the steady power source 112 to the subsea equipment 102. The control system 132 may include a memory 134, which may include volatile memory, such as random access memory (RAM), and/or non-volatile memory, such as read-only memory (ROM), optical drives, hard disc drives, solid-state drives, or any other non-transitory computer-readable medium that stores instructions 136 thereon. The control system 132 may also include processing circuitry 138, which may be configured to execute the instructions 136 stored on the memory 134. For example, the processing circuitry 138 may include one or more application specific integrated circuits (ASICs), one or more field programmable gate arrays (FPGAs), one or more general purpose processors, or any combination thereof. The control system 132 may further include communication circuitry 140, which may be a wireless or wired communication component that may facilitate establishing a connection to enable communication and control. The communication circuitry 140, for example, may include any suitable communication protocol including Wi-Fi, mobile telecommunications technology (e.g., 2G, 3G, 4G, 5G, LTE), Bluetooth®, near-field communications technology, a network interface, and the like. For instance, the communication circuitry 140 may communicatively couple the control system 132 to a switchgear 142 (e.g., one or more switches) that enables or blocks flow of power provided by the intermittent power source 124 and/or the steady power source 112.

As an example, the control system 132 may control the switchgear 142 based on detected power available from the intermittent power source 124. For instance, in response to a determination that the amount of power available from the intermittent power source 124 is above a threshold value (e.g., a power demand of the subsea equipment 102), the control system 132 may operate the switchgear 142 to enable power supply from the intermittent power source 124 and block power supply from the steady power source 112 to the subsea equipment 102. Thus, an entirety or substantially all of the power consumed by the subsea equipment 102 may be from the intermittent power source 124.

In some embodiments, the power available from the intermittent power source 124 may be greater than the amount consumed by operation of the subsea equipment 102. As a result, there may be excess power available from the intermittent power source 124. In such embodiments, the control system 132 may operate the switchgear 142 to enable flow of the excess power from the intermittent power source 124 to the topside system 104. The excess power may then be used to enable operation of any of the components of the topside system 104. In this manner, because the power demand of the topside system 104 may be partially fulfilled by the intermittent power source 124, the topside system 104 may consume less power from the steady power source 112 as compared to circumstances in which the topside system 104 does not receive any power from the intermittent power source 124. Therefore, while the topside system 104 receives power from the intermittent power source 124, operation of the steady power source 112 may be reduced. For example, one or more of the power generators 114 may be controlled to operate in a part load operating mode, an idle mode, a grid supply mode (e.g., supplying power back to the electrical power grid), or shutdown to conserve fuel. Additionally or alternatively, the excess power directed to the topside system 104 may be stored in the power storage 116 for usage at a later time and/or may be directed to the grid power 118 to reduce a cost associated with usage of the grid power 118. Additionally or alternatively, the excess power directed to the topside system 104 may be used for other operations that are not otherwise performed unless excess power is available. The other operations may include maintenance, service, and repair of components on the topside system 104.

However, in response to a determination that the amount of power available from the intermittent power source 124 is below the threshold value, the control system 132 may operate the switchgear 142 to enable power supply from the steady power source 112 to the subsea equipment 102. Thus, the subsea equipment 102 may consume power from the steady power source 112 (e.g., in addition to or as an alternative to the power from the intermittent power source 124) to operate while the amount of power from the intermittent power source 124 is insufficient. As such, the intermittent power source 124 may be a primary source of power for the subsea equipment 102, and the steady power source 112 may be a secondary source of power for the subsea equipment 102. In such embodiments, because each of the topside system 104 and the subsea equipment 102 may consume power from the steady power source 112, more power from the steady power source 112 may be consumed as compared to when the intermittent power source 124 provides sufficient power for operation of the subsea equipment 102. Therefore, while the subsea equipment 102 receives power from the steady power source 112, operation of the steady power source 112 may be increased to provide more power.

The switchgear 142 may be subsea in certain embodiments. That is, the switchgear 142 may be positioned within a body of water, such as adjacent to the subsea equipment 102. For this reason, the switchgear 142 may include an enclosure (e.g., a waterproof enclosure) that may block unwanted fluid flow into the enclosure to avoid impact on operation of various electronic components of the switchgear 142. In additional or alternative embodiments, the switchgear 142 may be positioned above surface. For example, the switchgear 142 may be coupled to the intermittent power source 124 (e.g., the wind turbine 126), positioned at the topside system 104, positioned separately from the intermittent power source 124 and the topside system 104, and so forth.

The control system 132 may operate the switchgear 142 to adjust power supply to the subsea equipment 102 based on various input data. By way of example, the system 100 may include one or more sensors 144 communicatively coupled to the control system 132, such as via the communication circuitry 140. The control system 132 may receive data from the sensors 144 and determine whether the power available from the intermittent power source 124 is sufficient to enable operation of the subsea equipment 102. For instance, the control system 132 may determine an amount of power available from the intermittent power source 124 based on the data and/or an amount of power to be consumed by the subsea equipment 102 based on the data. The control system 132 may then compare the power available from the intermittent power source 124 and the amount of power to be consumed by the subsea equipment 102 to one another. In response to determining that the power available from the intermittent power source 124 is greater than the amount of power to be consumed by the subsea equipment 102, the control system 132 may operate the switchgear 142 to block power supply from the steady power source 112 to the subsea equipment 102. In response to determining that the power available from the intermittent power source 124 is less than the amount of power to be consumed by the subsea equipment 102, the control system 132 may operate the switchgear 142 to enable power supply from the steady power source 112 to the subsea equipment 102.

In certain embodiments, the subsea equipment 102 may be configured to operate within a range of power, such that the subsea equipment 102 may have a lower power threshold (or minimum power demand) and an upper power threshold (or maximum power demand) for operation under normal conditions. The subsea equipment 102 also may have a desired power level between the lower and upper power thresholds. If the power available from the intermittent power source 124 is within the range of power, then the control system 132 may be configured to control operation of the subsea equipment 102 (e.g., by increasing or decreasing power usage within the lower and upper power thresholds) to operate only using the power available from the intermittent power source 124. In this manner, the intermittent power source 124 is used for the subsea equipment 102 without the power from the steady power source 112.

In certain embodiments, the data from the sensors 144 may directly indicate the power available from the intermittent power source 124. As another example, the data from the sensors 144 may include a parameter associated with an environmental condition, such as a wind speed, an air density, a location of the sun, an amount and/or intensity of sunlight, a water speed, a water salinity, a water temperature gradient, or any other parameter that may indicate performance of the intermittent power source 124 to generate energy. The control system 132 may therefore calculate the power available from the intermittent power source 124 based on the data.

As a further example, the control system 132 may receive data and analyze the data to predict power available from the intermittent power source 124 at a later time. For instance, the data may include a weather forecast, which may indicate environmental conditions at particular time intervals. The control system 132 may receive such data from certain external sources, such as the internet and/or a user input. The data may additionally or alternatively indicate a trend of the operation of the intermittent power source 124. For example, available power provided by the solar cell 128 may be decreasing because an amount of sunlight is changing as a result of movement of the sun and/or movement of clouds that may occlude the sun. The control system 132 may determine the trend based on historical data to determine available power at future time intervals. Therefore, the control system 132 may utilize previously received data to determine the available power at future time intervals and prepare to adjust operation of the switchgear 142 accordingly. By way of example, the control system 132 may predict that the power available from the intermittent power source 124 will be below a threshold value at a particular time stamp. In response, at the particular time stamp, the control system 132 may more readily adjust the switchgear 142 to enable power supply from the steady power source 112.

The data received by the control system 132 may further indicate power demand associated with the subsea equipment 102. In some embodiments, the data may directly indicate historical power consumption by the subsea equipment 102, and the control system 132 may predict the power demand based on the historical power consumption. In additional or alternative embodiments, the data may associate respective power demands with corresponding operating modes or operating parameters of the subsea equipment 102. Thus, the control system 132 may determine a particular operating mode of the subsea equipment 102 and determine the corresponding power demand associated with the particular operating mode. By determining the power demand associated with the subsea equipment 102, the control system 132 may determine whether the power available from the intermittent power source 124 is sufficient to meet the corresponding power demand. For example, the control system 132 may determine that the power available from the intermittent power source 124 is sufficient in response to the power being greater than or equal to the power demand of the subsea equipment 102, whereas the control system 132 may determine that the power available from the intermittent power source 124 is deficient in response to the power being less than the power demand of the subsea equipment 102. As a result, the control system 132 may operate the switchgear 142 to enable or block power supply from the steady power source 112 accordingly.

In some embodiments, the control system 132 may also receive data associated with the topside system 104. For example, the data may indicate a power demand of the topside system 104 and/or power available from the steady power source 112. The control system 132 may operate the switchgear 142 and/or the steady power source 112 based on such data. For instance, in embodiments in which excess power available from the intermittent power source 124 is directed to the topside system 104, the control system 132 may determine whether the excess power fulfills the power demand of the topside system 104 based on the data. In response to determining the excess power does not fulfill the power demand, the control system 132 may operate the steady power source 112 to provide the remaining power that fulfills the power demand of the topside system 104. Moreover, in embodiments in which the power available from the intermittent power source 124 does not sufficiently fulfill the power demand of the subsea equipment 102, the control system 132 may determine the power to be provided by the steady power source 112 to fulfill a remainder of the power demand of the subsea equipment 102, as well as to fulfill the power demand of the topside system 104. The control system 132 may then operate the steady power source 112 to provide such power. In this way, the control system 132 may operate various aspects of the system 100 to provide and/or distribute power more suitably.

Figure 3:
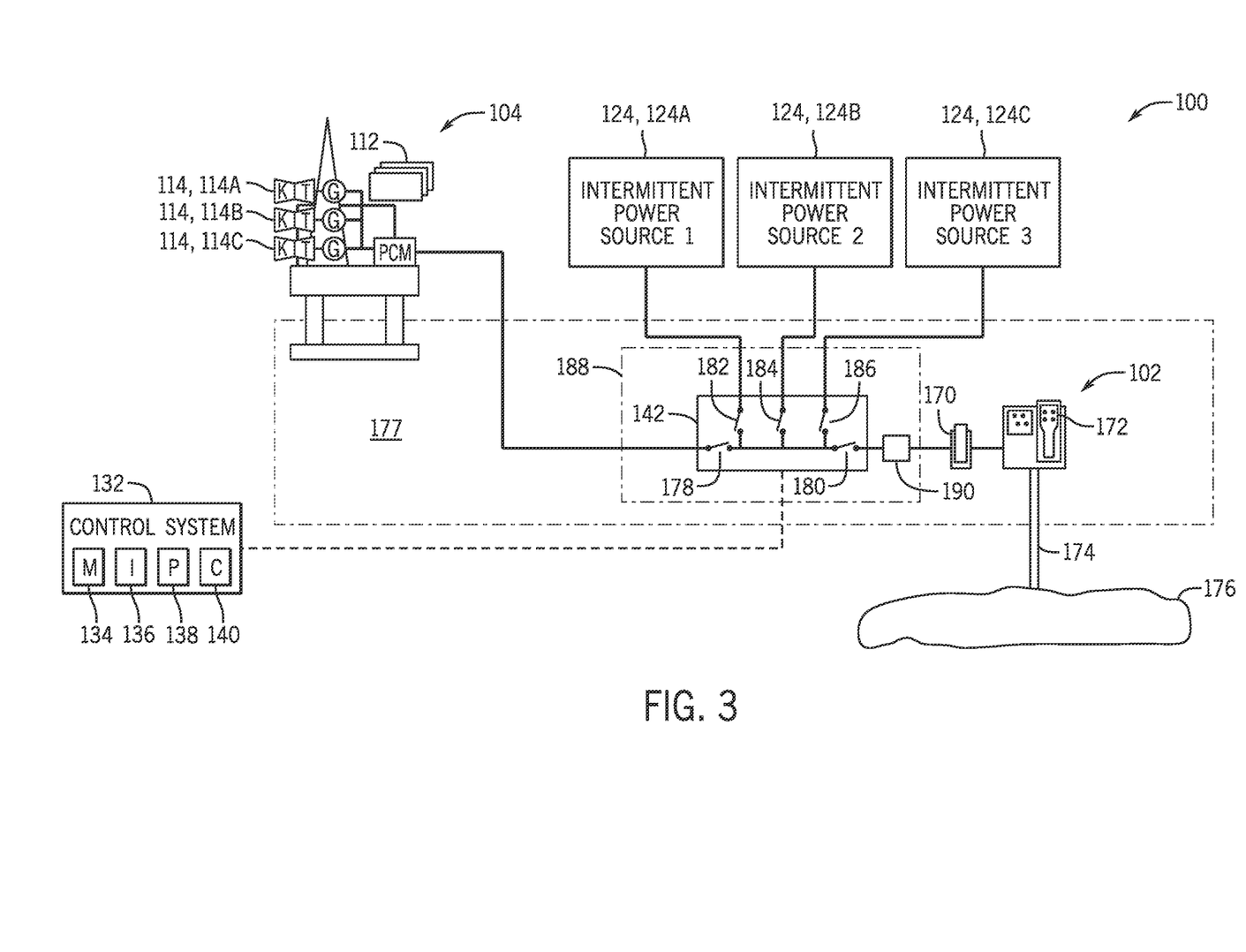
FIG. 3 is a schematic illustration of a system configured to control power supply to subsea equipment, according to an embodiment of the present disclosure.

FIG. 3 is a schematic illustration of an embodiment of the system 100. In the illustrated system 100, the subsea equipment 102 includes a variable speed drive (VSD) 170 and turbomachinery 172 (e.g., electric motor driven pump, turbine driven generator, or a combination thereof). The VSD 170 may drive operation of the turbomachinery 172 (e.g., electric motor driven pump), which is configured to pump a fluid flow. For example, the turbomachinery 172 may be configured to direct fluid through a wellbore 174 that is fluidly connected to a reservoir 176. In some embodiments, operation of the turbomachinery 172 may extract resources from the reservoir 176, thereby directing a resource flow from the reservoir 176, through the wellbore 174, and toward the turbomachinery 172 (e.g., to the topside system 104). In additional or alternative embodiments, the operation of the turbomachinery 172 may inject material into the reservoir 176, thereby directing the material from the turbomachinery 172, through the wellbore 174, and toward the reservoir 176. In further embodiments, operation of the turbomachinery 172 (e.g., turbine driven generator) may generate power, such as via fluid flow through the turbomachinery 172 (e.g., turbine) that causes rotation of the turbomachinery 172 (e.g., generator) to generate power by extracting mechanical energy from the fluid flow.

The VSD 170 may consume power to operate and drive corresponding operation of the turbomachinery 172 (e.g., control a speed of the electric motor, thereby adjusting a speed of the pump). The control system 132 may operate the switchgear 142 to control power flow to the VSD 170. For instance, the switchgear 142 may include a first switch 178 configured to control power flow between the switchgear 142 and the topside system 104 (e.g., the steady power source 112). The switchgear 142 may also include a second switch 180 configured to control power flow between the switchgear 142 and the VSD 170. Additionally, the system 100 may include a first intermittent power source 124A, a second intermittent power source 124B, and a third intermittent power source 124C. The intermittent power sources 124 may be arranged at any combination of onshore, offshore, and subsea locations. The switchgear 142 may include a third switch 182 configured to control power flow between the switchgear 142 and the first intermittent power source 124A, a fourth switch 184 configured to control power flow between the switchgear 142 and the second intermittent power source 124B, and a fifth switch 186 configured to control power flow between the switchgear 142 and the third intermittent power source 124C. Although the switchgear 142 and the VSD 170 are positioned subsea within a body of water 177 in the illustrated embodiment, the switchgear 142 and/or the VSD 170 may be positioned at any suitable position, such as outside of the body of water 177 (e.g., at an onshore location, coupled to an intermittent power source 124, at the topside system 104).

The control system 132 may operate the switchgear 142 to control the position of any of the switches 178, 180, 182, 184, 186. For instance, the control system 132 may adjust the position of any of the switches 178, 180, 182, 184, 186 to an open position that interrupts power flow or to a closed position that enables power flow. In some embodiments, the switches 178, 180, 182, 184, 186 may include normally open switches that may close in response to a signal received from the control system 132 and that may open in response to an absence of the signal received from the control system 132. In additional or alternative embodiments, the switches 178, 180, 182, 184, 186 may include normally closed switches that may open in response to a signal received from the control system 132 and that may close in response to an absence of the signal received from the control system 132.

In a first operating mode, which may include full operation of the intermittent power sources 124, the total power available from the intermittent power sources 124 may exceed the power demand of the VSD 170 (e.g., each of the intermittent power sources 124 may operate to generate power), and the control system 132 may operate the switchgear 142 to enable power flow from each of the intermittent power sources 124 to the switchgear 142. For example, the control system 132 may close each of the third switch 182, the fourth switch 184, and the fifth switch 186. Additionally, the control system 132 may operate the switchgear 142 to enable power flow from the switchgear 142 to the VSD 170 to enable operation of the turbomachinery 172, such as by closing the second switch 180. In this manner, the VSD 170 may consume power provided by any combination of the intermittent power sources 124 in the first operating mode. The control system 132 may also block power flow from the steady power source 112 to the VSD 170 in the first operating mode, as the power from the intermittent power sources 124 may fulfill the power demand of the VSD 170.

In the first operating mode, there may also be excess power available from the intermittent power sources 124, because the total amount of power available from the intermittent power sources 124 may be substantially greater than the power demand of the VSD 170. Therefore, the control system 132 may also operate the switchgear 142 to enable the excess power to flow from the intermittent power sources 124 to the topside system 104, such as by closing the first switch 178. As discussed herein, the excess power may be used to operate various components of the topside system 104, stored via the power storage 116 for usage (e.g., to provide power to the topside system 104 and/or the subsea equipment 102) at a later time, and/or directed to the grid power 118 to reduce a cost associated with consuming power received from the grid power 118.

In the first operating mode, because the power provided by the intermittent power sources 124 may fulfill at least a portion of the power demand of the topside system 104, operation of the steady power source 112 may be reduced to fulfill a remaining portion of the power demand of the topside system 104. As an example, the topside system 104 may include a first power generator 114A (e.g., a first combustion engine driven generator), a second power generator 114B (e.g., a second combustion engine driven generator), and a third power generator 114C (e.g., a third combustion engine driven generator). The power generators 114A, 114B, and 114C may include the same or different combustion engine driven generators, such as gas turbine driven generators, reciprocating engine driven generators, or a combination thereof. In the first operating mode, operation of at least one of the power generators 114 may be suspended or partially reduced in power output, such that operation of the remaining power generators 114 (and optionally the reduced power generator 114) may provide a sufficient amount of power to fulfill the remaining portion of the power demand of the topside system 104.

The system 100 may also operate in a second operating mode, which may include partial operation of the intermittent power sources 124, and the total power available from the intermittent power sources 124 is substantially equal to (e.g., matches) the power demand of the VSD 170. For example, at least one of the intermittent power sources 124 may operate to generate power in the second operating mode, but the total amount of power being generated may be less than that generated in the first operating mode. In the second operating mode, the control system 132 may operate the switchgear 142 to enable power flow from the intermittent power sources 124 to the VSD 170, such as by closing the second switch 180, the third switch 182, the fourth switch 184, and/or the fifth switch 186. However, the VSD 170 may consume substantially all of the power available from the intermittent power sources 124. Therefore, there may not be a substantial amount of excess power available from the intermittent power sources 124. For this reason, the control system 132 may operate the switchgear 142 to interrupt power flow from the intermittent power sources 124 to the topside system 104, such as by opening the first switch 178. As a result, the topside system 104 may consume power provided by the steady power source 112 and not by the intermittent power sources 124 in the second operating mode.

The system 100 may further operate in a third operating mode, which may include reduced operation of the intermittent power sources 124, and the total power available from the intermittent power sources 124 may be substantially less than the power demand of the VSD 170. That is, the power provided by the intermittent power sources 124 may not be sufficient to enable operation of the VSD 170. For example, one or more of the intermittent power sources 124 may not generate power during the third operating mode. During the third operating mode, the control system 132 may close the second switch 180, the third switch 182, the fourth switch 184, and/or the fifth switch 186 to enable power flow from any of the intermittent power sources 124 to the VSD 170. Thus, the VSD 170 may consume substantially all of the power available from the intermittent power sources 124, and such power may fulfill a portion of the power demand of the VSD 170. The control system 132 may additionally close the first switch 178 and enable power flow from the steady power source 112 to the VSD 170. The power provided by the steady power source 112 may fulfill a remaining portion of the power demand of the VSD 170. In this manner, a combination of the power from the steady power source 112 and the power from the intermittent power sources 124 may fulfill the power demand of the VSD 170 in the third operating mode.

In the third operating mode, because the steady power source 112 may operate to provide power to fulfill the power demand (e.g., substantially all of the power demand) of the topside system 104 and the power demand (e.g., at least a portion of the power demand) of the VSD 170, the steady power source 112 may increase operations to generate power. By way of example, each of the power generators 114 may operate during the third operating mode to provide sufficient power to be consumed by the topside system 104 and/or the VSD 170.

In a fourth operating mode, operation of the VSD 170 may be suspended. Thus, in the fourth operating mode, the control system 132 may operate the switchgear 142, such as by opening the second switch 180, to interrupt power flow to the VSD 170 in order to suspend operation of the VSD 170. However, power may be available from at least one of the intermittent power sources 124. As such, the control system 132 may operate the switchgear 142 to enable power flow from the intermittent power sources 124 to the topside system 104, such as by closing each of the first switch 178, the third switch 182, the fourth switch 184, and/or the fifth switch 186. In this manner, the topside system 104 may consume substantially all of the power available from the intermittent power sources 124. As an example, in the fourth operating mode, the power from the intermittent power sources 124 may fulfill a portion of the power demand of the topside system 104. Therefore, the operation of the steady power source 112 may be reduced in the fourth operating mode as compared to operation in the second operating mode and/or operation in the third operating mode to fulfill a remaining portion of the power demand of the topside system 104.

The system 100 may also operate in any other suitable operating mode, such as various operating modes in which different subsets of the switches 178, 180, 182, 184, 186 may be open and closed. By way of example, in another operating mode, one of the third switches 182, the fourth switches 184, or the fifth switches 186 may be opened to interrupt power flow from a corresponding one of the intermittent power sources 124 to the switchgear 142. For instance, the control system 132 may determine that the power available from a subset of the intermittent power sources 124 may fulfill the power demand of the VSD 170, and the control system 132 may enable power flow from the subset of the intermittent power sources 124 and block power flow from a remainder of the intermittent power sources 124 to fulfill the power demand of the VSD 170. In such an example, as the power demand of the VSD 170 changes (e.g., increases), the control system 132 may adjust the switchgear 142 to change (e.g., increase) the power flow from the intermittent power sources 124 to the VSD 170 to fulfill the changing power demand.

Moreover, in some embodiments, operation of the VSD 170 may be adjusted based on the power available from the intermittent power sources 124. For instance, the control system 132 may adjust the operation of the VSD 170 to enable the power available from the intermittent power sources 124 to fulfill the power demand of the VSD 170 and avoid consumption of the power from the steady power source 112 via the VSD 170. By way of example, the control system 132 may determine respective power demands associated with various operations (e.g., various speeds) of the VSD 170. Based on the power available from the intermittent power sources 124, the control system 132 may select a particular operation of the VSD 170 based on the power demand associated with the particular operation substantially matching the power available from the intermittent power sources 124. For example, in response to determining that the power available from the intermittent power sources 124 is decreasing (e.g., based on a trend and/or a weather forecast), the control system 132 may also reduce operation of the VSD 170. In this manner, the control system 132 may operate any combination of the switchgear 142 and/or the VSD 170 to enable suitable power flow that operates the VSD 170.

Further still, in certain embodiments, the switchgear 142 may be a part of a power hub 188 configured to distribute power to additional components or devices separate from the VSD 170, the intermittent power sources 124, and/or the topside system 104. That is, the switchgear 142 may distribute any received power (e.g., from the intermittent power sources 124, from the steady power source 112) to any other suitable recipient component that consumes electricity during operation, such as another processing system (e.g., an onshore processing system) and/or a hydrogen production system configured to produce hydrogen (e.g., hydrogen gas). To this end, the switchgear 142 may include additional switches that may open or close to control power flow to the recipient devices. Thus, the control system 132 may operate the switchgear 142 to control power distribution from the power hub 188 (e.g., power provided by the intermittent power sources 124 and/or the steady power source 112) to components in addition to the VSD 170. The power hub 188 may include one or more transformers 190 configured to adjust the voltage of the power flow provided to a certain recipient device. As an example, the voltage of the power flow provided by the intermittent power sources 124 and/or the steady power source 112 may be undesirable for input to the VSD 170. One of the transformers 190 may adjust the voltage and/or convert the electric power received by the VSD 170 to be more suitable for operation of the VSD 170, such as based on a manufacturer's specification of the VSD 170. For example, the transformer 190 may step up the voltage, step down the voltage, and/or convert the voltage between different forms (e.g., between alternating current and direct current). Thus, the transformers 190 may enable different recipient devices to receive more suitable power flow from the power hub 188.

The power hub 188 may further receive power generated by the subsea equipment 102 (e.g., via fluid flow through a generator) in some embodiments. In such embodiments, the control system 132 may operate the switchgear 142 to distribute the power generated by the subsea equipment 102 to another component, such as to the topside system 104 (e.g., the power storage 116). Indeed, the power hub 188 may receive power from any component, adjust the power (e.g., the voltage), and distribute the power to any other suitable component via the switchgear 142.

Each of FIGS. 4 and 5 described below illustrates a flowchart of a method or process for operating any of the systems described above. In some embodiments, a single device (e.g., the processing circuitry 138 of the control system 132) may perform each of the described methods. In additional or alternative embodiments, different devices may perform different operations of the methods. Each method may be implemented by executing instructions (e.g., the instructions 136) stored in a tangible, non-transitory, computer-readable medium (e.g., the memory 134). For example, each method may be performed at least in part by one or more software components, one or more hardware components, one or more software applications, and the like. While each method is described using operations in a specific sequence, additional operations may be performed, the described operations may be performed in different sequences than illustrated, and/or certain described operations may be skipped or not performed altogether. Moreover, operations of the different methods may be performed concurrently or sequentially with respect to one another.

Figure 4:
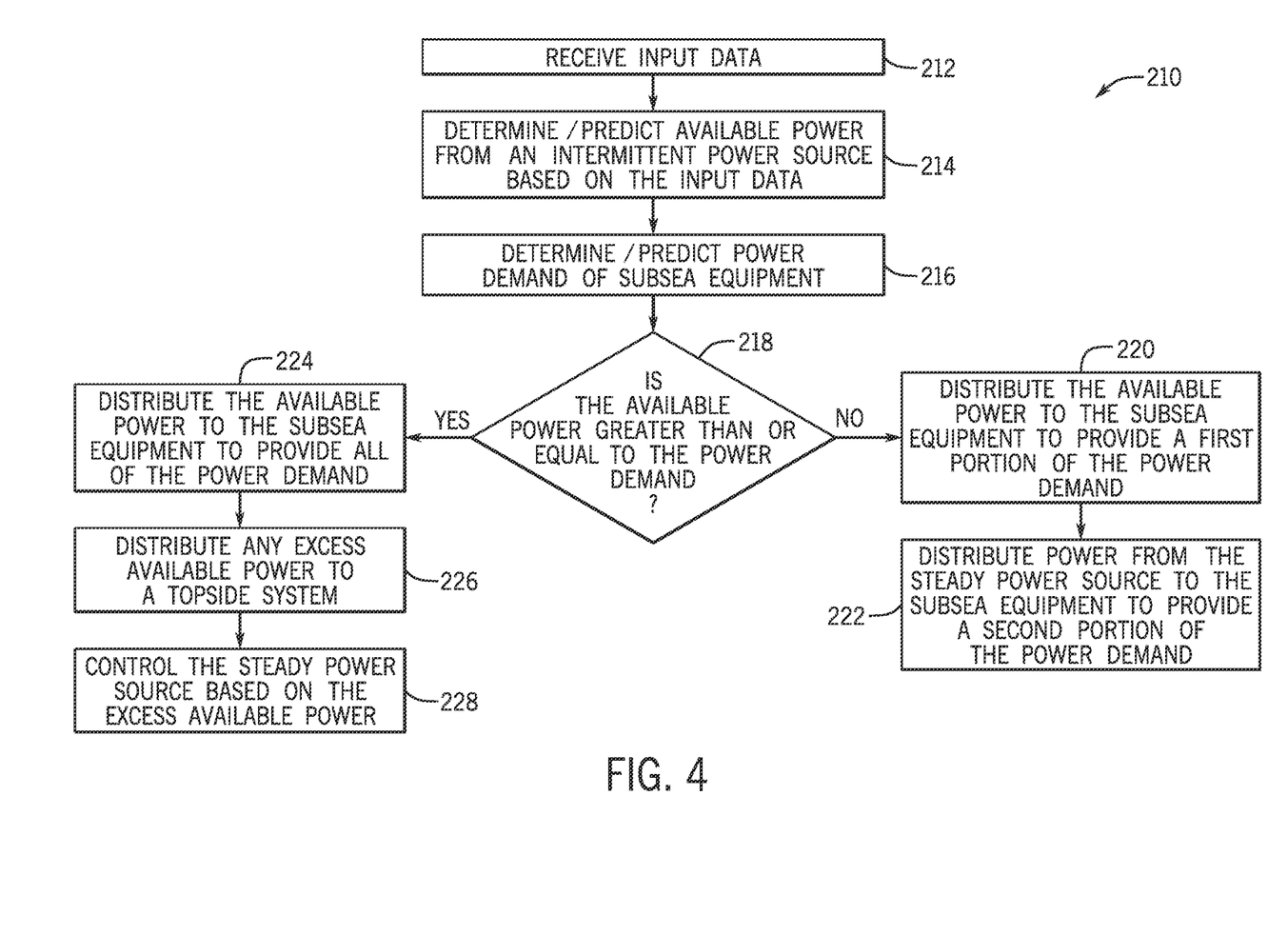
FIG. 4 is a flowchart of a method for operating a system configured to control power supply to subsea equipment, according to an embodiment of the present disclosure.

FIG. 4 is a flowchart of an embodiment of a method 210 for distributing power based on available power from an intermittent power source (e.g., any of the intermittent power sources 124). At block 212, input data may be received. The input data may be received from sensors, from the internet, via a user input, and the like. The input data may include any suitable parameter, such as a direct indication of power (e.g., power currently generated by the intermittent power source, power currently consumed by the subsea equipment), an environmental parameter, a weather forecast, a trend of operation of the intermittent power source, an operation of the subsea equipment, historical power consumption of the subsea equipment, any other suitable parameter, or any combination thereof.

At block 214, available power from the intermittent power source may be determined (e.g., calculated, predicted, estimated) based on the input data. At block 216, power demand of the subsea equipment may be determined (e.g., calculated, predicted, estimated) based on the input data. The available power and the power demand may then be compared to one another.

At block 218, a determination may be made regarding whether the available power is greater than or equal to the power demand based on the comparison between the available power and the power demand. At block 220, in response to determining that the available power is not greater than or equal to (i.e., is less than) the power demand, the available power may be distributed to the subsea equipment to provide a first portion of the power demand (e.g., as a primary source of power). That is, the available power from the intermittent power source may not be sufficient to fulfill an entirety of the power demand. Thus, at least a portion of the power demand may not be provided by the available power. In some embodiments, the available power may be distributed to the subsea equipment by closing a switch (e.g., of the switchgear 142) to enable power flow from the intermittent power source to the subsea equipment via the switch.

At block 222, power may be distributed from a steady power source (e.g., any of the steady power sources 112) to the subsea equipment to provide a second portion, such as a remaining portion, of the power demand (e.g., as a secondary source of power). In this manner, power from the steady power source and power from the intermittent power source may collectively fulfill the power demand. As an example, another switch (e.g., of the switchgear 142) may be closed to enable power flow from the steady power source to the subsea equipment via the switch. In certain embodiments, operation of the steady power source may be adjusted, such as increased, to provide sufficient power that provides for the second portion of the power demand and any other power demand (e.g., of the topside system 104) to be fulfilled by the steady power source.

However, at block 224, in response to determining that the available power from the intermittent power source is greater than or equal to the power demand of the subsea equipment, the available power may be distributed to the subsea equipment to provide an entirety or substantially all of the power demand. That is, the available power may sufficiently fulfill the power demand. For this reason, the subsea equipment may not receive any power from the steady power source. For example, a switch (e.g., of the switchgear 142) may close to enable power flow to the subsea equipment, but power flow from the steady power source to the subsea equipment may be blocked.

At block 226, any excess available power from the intermittent power source may be distributed to a topside system (e.g., the topside system 104). For instance, in embodiments in which the available power is substantially greater than the power demand, the excess available power may be equal to the difference between the available power and the power demand. The excess available power may be utilized to provide a portion of the power demand of the topside system (e.g., of the pipeline system 106, the processing system 108, the drilling equipment 110, the residential facilities 120, the control module 122), to store in power storage (e.g., the power storage 116) for usage at a later time, to direct to grid power (e.g., the grid power 118), for any other usage associated with the topside system, or any combination thereof. As an example, a switch (e.g., of the switchgear 142) may be operated to enable power flow from the intermittent power source to the topside system.

At block 228, the steady power source may be controlled based on the excess available power distributed to the topside system. By way of example, the excess available power may provide a portion of the power demand of the topside system. Operation of the steady power source may be controlled (e.g., reduced) to provide a remaining portion of the power demand of the topside system. For instance, a number of generators (e.g., the power generators 114) in operation and/or an operating mode of the generators may be adjusted (e.g., to a partial load). As such, the available power from the intermittent power source and the power from the steady power source may fulfill the power demand of the topside system while the available power from the intermittent power source is greater than the power demand of the subsea equipment.

It should be noted that the method 210 may be continually performed over time. That is, input data may continually be received, and the available power from the intermittent power source and/or the power demand of the subsea equipment may be determined based on updated input data to distribute power accordingly. As such, power distribution may be dynamically adjusted based on newly received input data in order to distribute power more suitably, such as based on updated determinations regarding whether the available power is greater than or equal to the power demand.

Furthermore, in some embodiments, the available power from the intermittent power source and/or the power demand of the subsea equipment may be predicted for a future period of time. For example, the input data may indicate a trend, a forecast, or any other parameter that may be analyzed to determine a projected amount of available power from the intermittent power source and/or a projected amount of power demand of the subsea equipment during a future period of time. Power may then be distributed in accordance with the intermittent power source and/or the power demand for the future period of time. As an example, the available power from the intermittent power source may be determined to be greater than or equal to the power demand of the subsea equipment for a first period of time in the future. In response, operations (e.g., to adjust a switch) may be scheduled to distribute the available power from the intermittent power source to the subsea equipment and to distribute any excess available power to the topside system during the first period of time. The available power may also be determined to be less than the power demand for a second period of time in the future. In response, operations (e.g., to adjust a switch) may be scheduled to distribute power from the steady power source, such as in addition to power from the intermittent power source, to the subsea equipment. Operation of the steady power source may also be scheduled to adjust at the second period of time to provide sufficient power to fulfill the power demand of the subsea equipment (e.g., in addition to the power demand of the topside system). Indeed, any of the operations of the method 210 may be performed in association with any suitable period of time.

Figure 5:
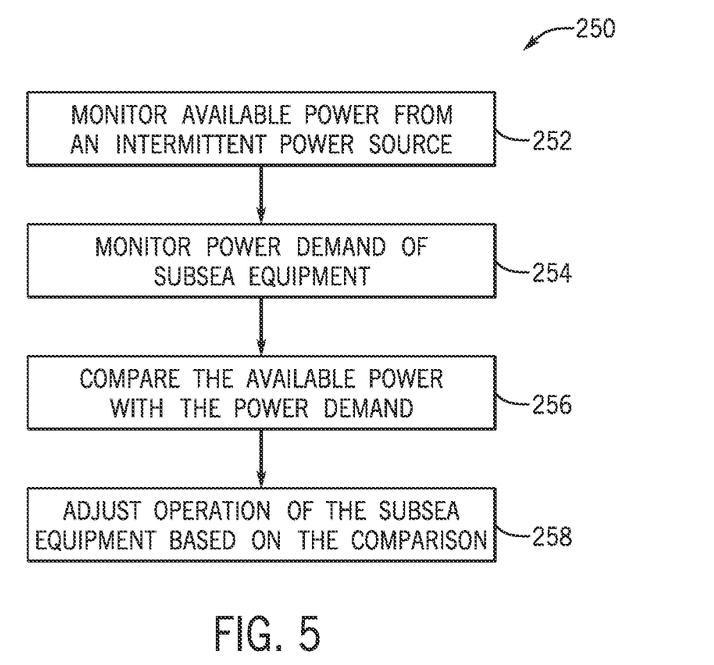
FIG. 5 is a flowchart of a method for operating subsea equipment based on power available from a power source, according to an embodiment of the present disclosure.

FIG. 5 is a flowchart of an embodiment of a method 250 for operating subsea equipment based on available power from an intermittent power source. At block 252, available power from an intermittent power source (e.g., any of the intermittent power sources 124) may be monitored. At block 254, power demand of the subsea equipment may be monitored. As an example, using the techniques discussed herein, input data may be received and may be used to determine (e.g., calculate, predict, estimate) the available power and/or the power demand.

At block 256, the determined available power may be compared with the determined power demand. During the comparison, a determination may be made regarding whether the available power is greater than, less than, or equal to the power demand. At block 258, operation of the subsea equipment may be adjusted based on the comparison. By way of example, the operation of the subsea equipment may be adjusted to adjust the power demand (or power usage) toward the available power. For instance, based on the comparison between the available power and the power demand, a determination may be made that the available power is less than the power demand. That is, the available power may not sufficiently fulfill the power demand. In response, the operation of the subsea equipment may be adjusted to reduce the power demand (or power usage) of the subsea equipment, such as to reduce the power demand to be at or below the available power. As a result, the available power may be utilized to fulfill the power demand (e.g., without distributing power from the steady power source to the subsea equipment). A determination may also be made that the available power is greater than the power demand. In response, the operation of the subsea equipment may be adjusted to increase operation of the subsea equipment, which may increase the power demand (or power usage) of the subsea equipment, but may nonetheless maintain the power demand at or below the available power.

In some embodiments, operation of the subsea equipment may be adjusted by adjusting certain operating parameters of the subsea equipment. For instance, the subsea equipment (e.g., the subsea equipment 102) may include the VSD 170 that consumes power during operation, such as to drive operation of the turbomachinery 172. The VSD 170 may be configured to operate at different speeds, each associated with a different power demand. The speed of the VSD 170 may be adjusted to a particular speed based on the associated power demand being more similar to the available power. As an example, in response to the power demand exceeding the available power, the speed of the VSD 170 may be reduced to correspondingly reduce the power demand below the available power. As another example, in response to the available power exceeding the power demand, the speed of the VSD 170 may be increased to increase operation of the VSD 170 (e.g., to increase the flow rate of fluid directed by the turbomachinery 172 via operation of the VSD 170), while maintaining the power demand at or below the available power.

In certain embodiments, operation of the subsea equipment may be adjusted to change the flow of fluid being directed or pumped. By way of example, in response to determining the flow rate and/or pressure of the fluid directed by the turbomachinery 172 is below a threshold value, the fluid may be recirculated through the turbomachinery 172 (e.g., from an outlet of the turbomachinery 172 back to an inlet of the turbomachinery 172). Recirculation of the fluid through the turbomachinery 172 may increase the flow rate and/or pressure of the fluid, such as above the threshold value. That is, the fluid may initially flow through the turbomachinery 172, which pressurizes the fluid, and the fluid may recirculate to flow through the turbomachinery 172, which then further pressurizes the fluid. The additional pressurization of the fluid during recirculation of the fluid through the turbomachinery 172 may provide the fluid at a desirable flow rate and/or pressure, such as at certain reduced operations of the turbomachinery. As an example, to enable recirculation of the fluid through the turbomachinery 172, a valve may be opened to enable flow of the fluid (e.g., through a recirculation pipeline) from the outlet of the turbomachinery 172 to the inlet of the turbomachinery 172. An additional valve may also be closed to block flow of the fluid through downstream equipment, thereby forcing the fluid to recirculate through the turbomachinery 172.

In additional or alternative embodiments, the subsea equipment may include multiple different components that may consume power during operation. That is, each component may be associated with a respective power demand, and the power demand of the subsea equipment may include a total of the power demands for each component. In such embodiments, in order to adjust the power demand of the subsea equipment toward the available power from the intermittent power source, certain components of the subsea equipment may be selectively operated to enable the available power to fulfill the respective power demands associated with the components in operation. That is, components of the subsea equipment may be operated based on the total power demand enabling the operation of such components being less than or equal to the available power. For example, certain components may be suspended and/or reduced in power demand to reduce the overall power demand of the subsea equipment toward the available power.

Operation of the method 250 may also be performed continually, such as based on updated determinations of the available power and/or the power demand. Thus, the operation of the subsea equipment may be continually adjusted to adjust the power demand toward the available power. In this manner, the operation of the subsea equipment may be more suitable based on the available power from the intermittent power source to avoid utilizing a substantial amount of power from the steady power source to operate the subsea equipment.

Operation of the method 250 may further be performed to schedule operation of the subsea equipment for future periods of time. That is, available power and/or power demand may be predicted for a period of time, and operation of the subsea equipment may be scheduled to adjust accordingly at the period of time. For example, a determination may be made that the available power will be less than the power demand during a first period of time. Therefore, operation of the subsea equipment at the first period of time may be adjusted to reduce the power demand toward the available power. Another determination may be made that the available power will be greater than the power demand during a second period of time. In response, the operation of the subsea equipment at the second period of time may be adjusted to increase the operation of the subsea equipment and increase the power demand toward the available power, while maintaining the power demand below the available power.

While the subject disclosure is described through the above embodiments, it will be understood by those of ordinary skill in the art that modification to and variation of the illustrated embodiments may be made without departing from the inventive concepts herein disclosed. Moreover, while some embodiments are described in connection with various illustrative structures, one skilled in the art will recognize that the system may be embodied using a variety of specific structures.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A non-transitory, computer-readable medium comprising instructions that, when executed by processing circuitry, are configured to cause the processing circuitry to:
   receive input data;
   determine available power from an intermittent power source based on the input data, wherein the intermittent power source comprises a wind turbine, a solar cell, a marine power system, or any combination thereof;
   determine power demand of subsea equipment based on the input data;
   operate a switch to enable power flow from the intermittent power source to the subsea equipment as a primary source of power for the subsea equipment; and
   operate the switch to enable additional power flow from a steady power source to the subsea equipment in response to determining that the available power is less than the power demand, wherein the steady power source comprises a generator, a power storage, grid power, or any combination thereof.

2. The non-transitory, computer-readable medium of claim 1, wherein the instructions, when executed by the processing circuitry, are configured to cause the processing circuitry to operate the switch to block the additional power flow from the steady power source to the subsea equipment in response to determining that the available power is greater than or equal to the power demand.

3. The non-transitory, computer-readable medium of claim 1, wherein the instructions, when executed by the processing circuitry, are configured to cause the processing circuitry to operate the switch to enable at least a portion of the power flow from the intermittent power source to a topside system in response to determining that the available power is greater than the power demand.

4. The non-transitory, computer-readable medium of claim 3, wherein the steady power source is configured to provide power to the topside system, and the instructions, when executed by the processing circuitry, are configured to cause the processing circuitry to:
   determine additional power demand of the topside system;
   determine a portion of the additional power demand provided by the at least a portion of the power flow from the intermittent power source to the topside system; and
   operate the steady power source to provide a remaining portion of the additional power demand.

5. The non-transitory, computer-readable medium of claim 1, wherein the instructions, when executed by the processing circuitry, are configured to cause the processing circuitry to:
   determine the available power from the intermittent power source and the power demand of the subsea equipment associated with a future period of time based on the input data; and
   schedule operation of the switch to enable the additional power flow from the steady power source to the subsea equipment during the future period of time in response to determining that the available power is less than the power demand associated with the future period of time.

6. The non-transitory, computer-readable medium of claim 1, wherein the input data comprises an environmental parameter, a weather forecast, a trend of operation of the intermittent power source, an operation of the subsea equipment, historical power consumption of the subsea equipment, or any combination thereof.

7. The non-transitory, computer-readable medium of claim 1, wherein the instructions, when executed by the processing circuitry, are configured to cause the processing circuitry to adjust operation of the subsea equipment to adjust the power demand of the subsea equipment toward the available power from the intermittent power source.

8. A method, comprising:
   operating a switch to enable power flow from an intermittent power source to subsea equipment as a primary source of power, wherein the intermittent power source comprises a wind turbine, a solar cell, a marine power system, or any combination thereof;
   operating the switch to enable additional power flow from a steady power source to the subsea equipment in response to determining that available power from the intermittent power source is less than power demand of the subsea equipment, wherein the steady power source comprises a generator, a power storage, grid power, or any combination thereof; and
   operating the switch to block the additional power flow from the steady power source to the subsea equipment in response to determining that the available power from the intermittent power source is greater than or equal to the power demand of the subsea equipment.

9. The method of claim 8, wherein the steady power source is configured to provide power to a topside system, and the method comprises operating the switch to block the power flow from the intermittent power source to the topside system in response to determining that the available power from the intermittent power source is equal to the power demand of the subsea equipment.

10. The method of claim 8, wherein the steady power source is configured to provide power to a topside system, and the method comprises operating the switch to enable a first portion of the power flow from the intermittent power source to the subsea equipment and to enable a second portion of the power flow from the intermittent power source to the topside system in response to determining that the available power from the intermittent power source is greater than the power demand of the subsea equipment.

11. The method of claim 8, wherein operating the switch to enable the additional power flow from the steady power source to the subsea equipment in response to determining that the available power from the intermittent power source is less than the power demand of the subsea equipment comprises operating the switch to enable the additional power flow from the steady power source to the subsea equipment to provide a first portion of the power demand of the subsea equipment and to enable the power flow from the intermittent power source to the subsea equipment to provide a second portion of the power demand of the subsea equipment.

12. The method of claim 8, comprising:
predicting the available power from the intermittent power source at a period of time;
predicting the power demand of the subsea equipment at the period of time;
operating the switch to enable the additional power flow from the steady power source to the subsea equipment at the period of time in response to determining that the available power is less than the power demand at the period of time; and
operating the switch to block the additional power flow from the steady power source to the subsea equipment at the period of time in response to determining that the available power is greater than or equal to the power demand at the period of time.

13. The method of claim 8, comprising:
suspending operation of the subsea equipment; and
operating the switch to block the additional power flow from the steady power source to the subsea equipment in response to suspending the operation of the subsea equipment.

14. The method of claim 13, wherein the steady power source is configured to provide power to a topside system, and the method comprises operating the switch to enable the power flow from the intermittent power source to the topside system in response to suspending the operation of the subsea equipment.

15. A system, comprising:
a switchgear configured to enable first power flow between an intermittent power source and the switchgear and to enable second power flow between a steady power source and the switchgear, wherein the intermittent power source comprises a wind turbine, a solar cell, a marine power system, or any combination thereof, the steady power source comprises a generator, a power storage, grid power, or any combination thereof, and the steady power source is configured to provide power to a topside system;
subsea equipment configured to receive the first power flow, the second power flow, or both via the switchgear; and
a controller communicatively coupled to the switchgear and configured to operate the switchgear to:
enable the first power flow to the subsea equipment as a primary source of power; and
enable the second power flow to the subsea equipment in response to determining that the first power flow is less than power demand of the subsea equipment.

16. The system of claim 15, wherein the subsea equipment comprises turbomachinery and a drive configured to consume power to operate the turbomachinery, and the controller is configured to operate the switchgear to enable the second power flow to the drive in response to determining that the first power flow is less than power demand of the drive to enable the drive to consume the second power flow to operate the turbomachinery.

17. The system of claim 16, wherein the turbomachinery is configured to extract resources from a reservoir, inject material into the reservoir, generate power via fluid flow therethrough, or any combination thereof.

18. The system of claim 15, wherein the controller is configured to operate the switchgear to enable the first power flow to the subsea equipment to provide at least a portion of the power demand of the subsea equipment.

19. The system of claim 15, wherein the controller is configured to operate the switchgear to enable at least a portion of the first power flow to the topside system in response to determining that the first power flow is greater than the power demand of the subsea equipment.

20. The system of claim 15, wherein the switchgear is configured to enable respective first power flows between a plurality of intermittent power sources comprising the intermittent power source and the switchgear, the switchgear comprises a plurality of switches, and each switch of the plurality of switches is configured to enable a respective first power flow between a corresponding intermittent power source of the plurality of intermittent power sources and the switchgear.

* * * * *